(12) United States Patent
Pinet et al.

(10) Patent No.: US 9,815,209 B2
(45) Date of Patent: Nov. 14, 2017

(54) CASING WITH MODULAR VACUUM

(71) Applicant: COVAL, Montelier (FR)

(72) Inventors: Maxime Pinet, Montoison (FR);
Michel Cecchin, Montelier (FR);
Pierre Milhau, Bourg de Peage (FR)

(73) Assignee: Coval, Montelier (FR)

( * ) Notice: Subject to any disclaimer, the term of this patent is extended or adjusted under 35 U.S.C. 154(b) by 0 days.

(21) Appl. No.: 15/117,159

(22) PCT Filed: Feb. 5, 2015

(86) PCT No.: PCT/EP2015/052453
§ 371 (c)(1),
(2) Date: Aug. 5, 2016

(87) PCT Pub. No.: WO2015/118086
PCT Pub. Date: Aug. 13, 2015

(65) Prior Publication Data
US 2016/0346938 A1 Dec. 1, 2016

(30) Foreign Application Priority Data

Feb. 6, 2014 (FR) ..................................... 14 50930

(51) Int. Cl.
A47B 97/00 (2006.01)
B66C 1/02 (2006.01)
B25J 15/06 (2006.01)

(52) U.S. Cl.
CPC ................................ B25J 15/0616 (2013.01)

(58) Field of Classification Search
CPC ....... H01L 21/6838; B66C 1/02; B65G 47/90; B25J 15/0616

USPC .......................................... 294/65, 183, 87.1
See application file for complete search history.

(56) References Cited

U.S. PATENT DOCUMENTS

| 2,535,952 | A | | 12/1950 | Partridge |
| 3,222,051 | A | | 12/1965 | Bevilacqua |
| 3,366,410 | A | | 1/1968 | Dogg |
| 3,591,228 | A | | 7/1971 | Webb |
| 4,674,785 | A | * | 6/1987 | Riesenberg ........... B25B 11/005 294/186 |
| 4,881,770 | A | * | 11/1989 | Marzinotto ............ B65G 47/91 294/186 |

(Continued)

FOREIGN PATENT DOCUMENTS

| DE | 2910145 A1 | 9/1980 |
| DE | 3028763 | 2/1981 |

(Continued)

Primary Examiner — Stephen Vu
(74) Attorney, Agent, or Firm — Muncy, Geissler, Olds & Lowe, P.C.

(57) ABSTRACT

A modular vacuum gripper having a first plate, a second plate provided with at least one downstream orifice, framework members, assembly device for assembling the first plate, the second plate and the framework members, at least one upstream orifice situated on one of the walls of the vacuum gripper, sealing device, vacuum generation device adapted to suck out the air contained inside the vacuum gripper via the upstream orifice, and at least one deformable element extending over the second plate so as to form a sealed contact surface with the part when the air contained inside the vacuum gripper is sucked out.

10 Claims, 5 Drawing Sheets

(56) References Cited

U.S. PATENT DOCUMENTS

| | | | | |
|---|---|---|---|---|
| 4,892,296 | A | * | 1/1990 | Jelinek .................. B25B 11/005 269/21 |
| 5,749,614 | A | * | 5/1998 | Reid ...................... B65G 47/91 414/627 |
| 6,439,631 | B1 | * | 8/2002 | Kress .................. B65G 47/918 294/65 |
| 2006/0082172 | A1 | | 4/2006 | Clark |
| 2010/0040450 | A1 | | 2/2010 | Parnell |

FOREIGN PATENT DOCUMENTS

| | | |
|---|---|---|
| DE | 9307503 U1 | 9/1993 |
| DE | 9418579 U1 | 2/1995 |
| FR | 2601088 A1 | 1/1988 |

\* cited by examiner

CASING WITH MODULAR VACUUM

The invention relates to gripper apparatus, and more particularly to a modular vacuum gripper for taking hold of a part.

BACKGROUND OF THE INVENTION

Vacuum grippers are used in many industrial fields (automobile industry, pharmaceuticals, etc.), e.g. for applications for taking hold of, handling, and manipulating parts on a production line.

A vacuum gripper associated with a pneumatic or electric vacuum generator includes a gripper plate on which gripper means are designed to take hold of the part when the air contained inside the vacuum gripper is sucked out. Such gripper means are usually constituted either by a certain number of suction cups, or by a foam pad having a certain number of gripper points.

Each particular gripping application has its own constraints. Thus, parts that vacuum grippers are suitable for handling or manipulating are of variable weights and sizes. In addition, the required levels of vacuum, and the gripping cycle times differ depending on the applications.

Vacuum grippers must thus be manufactured in such a manner as to satisfy the constraints specific to the particular gripping application in which they are used. It is thus relatively complex to implement methods of mass producing such grippers and thus to manufacture such grippers in short times and at low cost.

OBJECT OF THE INVENTION

An object of the invention is to reduce the cost and time for manufacturing a vacuum gripper, and to simplify manufacture of vacuum grippers of various formats.

SUMMARY OF THE INVENTION

With a view to achieving this object, the invention provides a modular vacuum gripper for taking hold of a part, said modular vacuum gripper comprising:
   a first plate forming a top wall of the vacuum gripper;
   a second wall provided with at least one downstream orifice and forming a bottom wall of the vacuum gripper;
   framework members to which edges of the first and second plates are fastened and that form side walls of the vacuum gripper;
   assembly means for assembling the first plate, the second plate and the framework members;
   at least one upstream orifice situated on one of the walls of the vacuum gripper;
   sealing means for preventing exchange of air between the inside of the vacuum gripper and the outside of the vacuum gripper other than via the upstream orifice and via the downstream orifice;
   vacuum generation means adapted to suck out the air contained inside the vacuum gripper via the upstream orifice so as to generate a vacuum inside the vacuum gripper; and
   at least one deformable element extending over the second plate and having an air passage orifice facing the downstream orifice so as to form a sealed contact surface with the part when the air contained inside the vacuum gripper is sucked out.

Dimensioning the vacuum gripper of the invention for any particular gripping application requires only a limited number of relatively simple operations while it is being manufactured. Such dimensioning consists, in particular, in dimensioning and manufacturing the framework members as a function of the constraints of the particular gripping application, and then in adapting the first plate and the second plate as a function of the dimensions of the framework members. Manufacturing the second plate is relatively simple, and, for example, may be achieved by cutting out from a previously manufactured similar plate of larger area. The first plate is manufactured in the same manner. The framework members are obtained from previously manufactured framework members that are of longer lengths and that are cut to lengths corresponding to the length and to the width of the second plate.

Dimensioning the vacuum gripper of the invention is thus compatible with efficient mass production, making it possible to reduce the cost and time for manufacturing the vacuum gripper.

The invention can be better understood on reading the following description of a non-limiting particular embodiment of the invention.

BRIEF DESCRIPTION OF THE DRAWINGS

Reference is made to the accompanying drawings, in which.

DETAILED DESCRIPTION OF THE INVENTION

Figure 1:
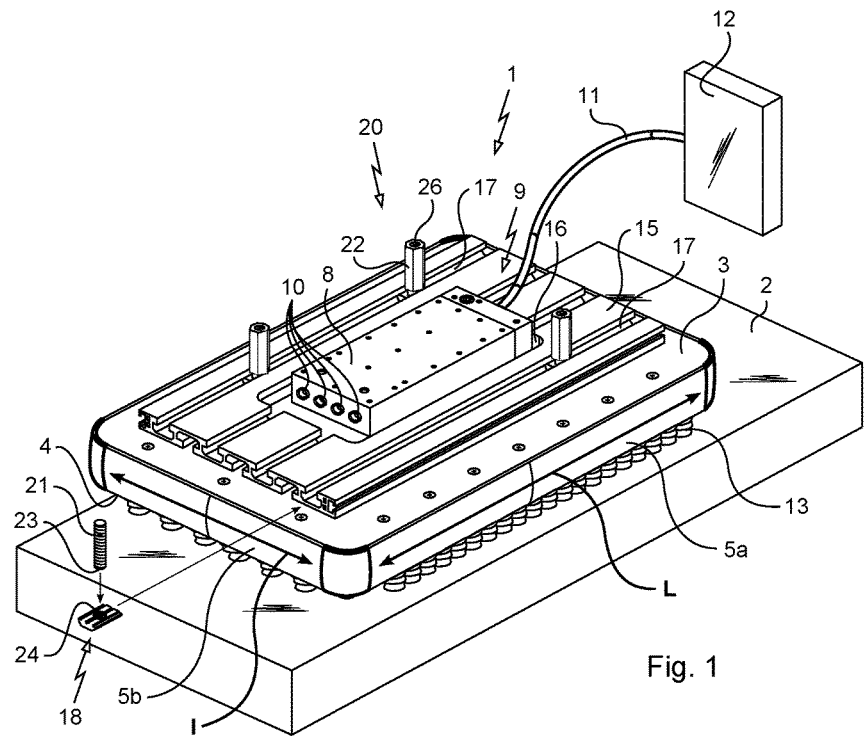
FIG. 1 is a perspective view of a modular vacuum gripper in a first embodiment of the invention, and of a part being manipulated by the gripper.

With reference to FIG. 1, the invention relates to a modular vacuum gripper 1 for taking hold of a part, which gripper is used in this example in an application for manipulating a cardboard box 2 containing, for example, foodstuffs, said cardboard box 2 being rectangular block shaped and having a relatively large weight and a relatively large size.

The modular vacuum gripper 1 of the invention has a first plate 3 forming a top wall of the vacuum gripper 1, a second plate 4 forming a bottom wall of the vacuum gripper 1, and framework members 5 to which edges of the first plate 3 and of the second plate 4 are fixed and which form side walls of the vacuum gripper 1. The first plate 3 is provided with an upstream orifice while the second plate is provided with a certain number of downstream orifices.

Vacuum generation means, operating by Venturi effect, are mounted on the first plate 3. In a first embodiment of the vacuum gripper 1, shown in FIG. 1, these vacuum generation means are constituted by a "multi-stage" vacuum generator 8 that is provided with a compressed air intake orifice 9 and with discharge orifices 10. The intake orifice 9 is connected to a plurality of vacuum generation chambers disposed in series inside the vacuum generator 8, one behind the other. Each of these chambers is provided with a nozzle and with at least one side orifice communicating via the upstream orifice in the first plate 3 with the inside of the vacuum gripper 1. When compressed air is admitted via the intake orifice 9, the air contained in the vacuum gripper 1 is sucked out by the side orifices via the upstream orifice, thereby generating a vacuum inside the vacuum gripper 1. The intake orifice 9 is connected via a pipe 11 to a control unit 12 connected to a compressed air source that is not shown in FIG. 1.

A certain number of deformable elements, which are suction cups 13 in this example, extend over the second plate 4. In this example, the suction cups 13 are mounted on inserts that are themselves fastened by screw-fastening or by clipping onto the second plate. Each suction cup 13 has an air passage orifice positioned facing a downstream orifice in the second plate 4. When a vacuum is generated inside the vacuum gripper 1, the air contained in each suction cup 13 is sucked out via the passage orifice in the suction cup 13 and via the facing downstream orifice.

Thus, when the vacuum generator 8 sucks out the air contained inside the vacuum gripper 1, the suction cups 13, as applied against the surface of the cardboard box 2 are united with it and take hold of the cardboard box 2.

In order to manipulate the cardboard box 2 once it has been taken hold of, it thus suffices to manipulate the vacuum gripper 1. For this purpose, the vacuum gripper 1 is provided with fastening means situated on the first plate 3. These fastening means are designed to fasten one end of a gripper arm (not shown in the figures) to the vacuum gripper 1, said gripper arm then being operated manually or automatically to manipulate the vacuum gripper 1 and thus the cardboard box 2.

The fastening means have at least a shaped-section portion, and in this example a shaped-section plate 15 positioned on the first plate 3. The shaped-section plate 15 is provided with an opening 16 inside which the vacuum generator 8 is positioned. In this example, the shaped-section plate 15 defines four slideways 17, each of two of which slideways 17 receives, inter alia, two tapped gib plates 18 whose position can be defined manually by causing the tapped gib plates 18 to slide along the slideways 17. In addition to the shaped-section plate 15 and to the tapped gib plates 18, the fastening means include four spacers 20, each of which is made up of a threaded body 21 and of a long nut 22. A first end 23 of each threaded body 21 is screwed into a tapped hole 24 in a tapped gib plate 18, thereby making it possible, by compression, to assemble each spacer 20 to the shaped-section plate 15. Since the threaded body 21 of each spacer 20 does not extend over the entire length of the long nut 22 when the threaded body 21 is screwed into the tapped hole 24 in the corresponding gib plate, each spacer 20 has a tapped free end 26 used for securing the end of the gripper arm to the shaped-section plate 15 and thus to the vacuum gripper 1.

With reference to FIGS. 1 to 5, the framework members 5 are now described in more detail, as is the manner in which they are assembled to the first plate 3 and to the second plate 4.

The framework members 5 of the vacuum chamber 1 comprise two first framework members 5a disposed along the length of the vacuum gripper and two second framework members 5b disposed along the width of the vacuum gripper 1.

At least one of these framework members 5 includes a shaped-section element. In this example, each framework member 5 includes a shaped-section element 30, of length L for the first framework members 5a and of length for the second framework members 5b.

Fastening studs 31 are disposed in the framework members 5. Each fastening stud 31 has a circular base 32 and a tapped insert 33. The circular bases 32 of the fastening studs 31 are inserted into the top slideways 34a and into the bottom slideways 34b of the shaped-section elements 30 of the framework members 5.

The first plate 3 is positioned above the framework members 5, and is screwed to the tapped inserts 33 of the fastening studs 31 situated in the top slideways 34a via screws passing through fastening holes in the first plate 3. Similarly, the second plate 4 is positioned above the framework members 5, and is screwed to the tapped inserts 33 of the fastening studs 31 situated in the bottom slideways 34b via screws passing through fastening holes in the second plate 4. At each of its corners, the vacuum gripper 1 also includes assembly means, in this example fastening corners 36 forming the corners of the vacuum gripper 1. Each fastening corner 36 is screwed to one of the first framework members 5a and to one of the second framework members 5b via the side internal tapped holes 33 in said framework members 5a, 5b.

Once the first plate 3, the second plate 4, the first framework members 5a, the second framework members 5b, and the fastening corners 36 are assembled together and screwed together, protective corners 37 are disposed at each corner of the vacuum gripper 1 to close the vacuum gripper 1 and to create continuity along the outside surfaces of the side walls of the vacuum gripper 1 formed by the framework members 5. The protective corners 37 are fastened to the fastening corners 36. For this purpose, each protective corner 37 has two fastening tabs 38 adapted to be inserted into two complementary reception orifices 39 in the fastening corners 36.

The vacuum gripper 1 also includes sealing means for preventing, an exchange of air between the inside of the vacuum gripper 1 and the outside of the vacuum gripper 1 other than via the upstream orifice and via the downstream orifices. The sealing means comprise flat seals or gaskets 40 that are disposed along the framework members 5 in first top grooves 41 and in first bottom grooves of the framework members 5 so as to extend over the entire lengths of the framework members 5. The sealing means further comprise O-ring seals 43 situated at the fastening corners 36 and disposed in second top grooves 44 and in second bottom grooves of the fastening corners 36. The flat seals 40 and the O-ring seals 43 must be positioned in the first top grooves 41 and in the second top grooves 44 before the first plate 3 is screwed to the framework members 5, and in the first bottom grooves and in the second bottom grooves before the second plate 4 is screwed to the framework members 5.

Figure 6:
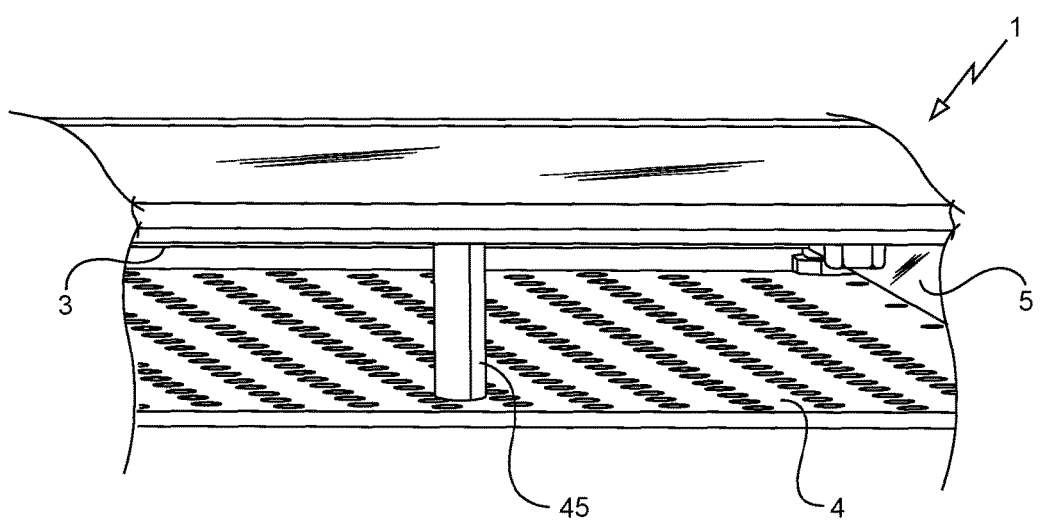
FIG. 6 is a detail view of the inside of the modular vacuum gripper of the invention, showing an anti-implosion protective stud.

With reference to FIG. 6, the vacuum gripper 1 is equipped with one or more anti-implosion protective studs 45. These studs 45 make it possible to reinforce the structure of the vacuum gripper 1 and to improve its resistance to the stresses caused by the difference in pressure between the external pressure and the internal pressure of the vacuum gripper. The studs 45 are positioned inside the vacuum gripper 1 and extend between the first plate 3 and the second plate 4.

Figure 7:
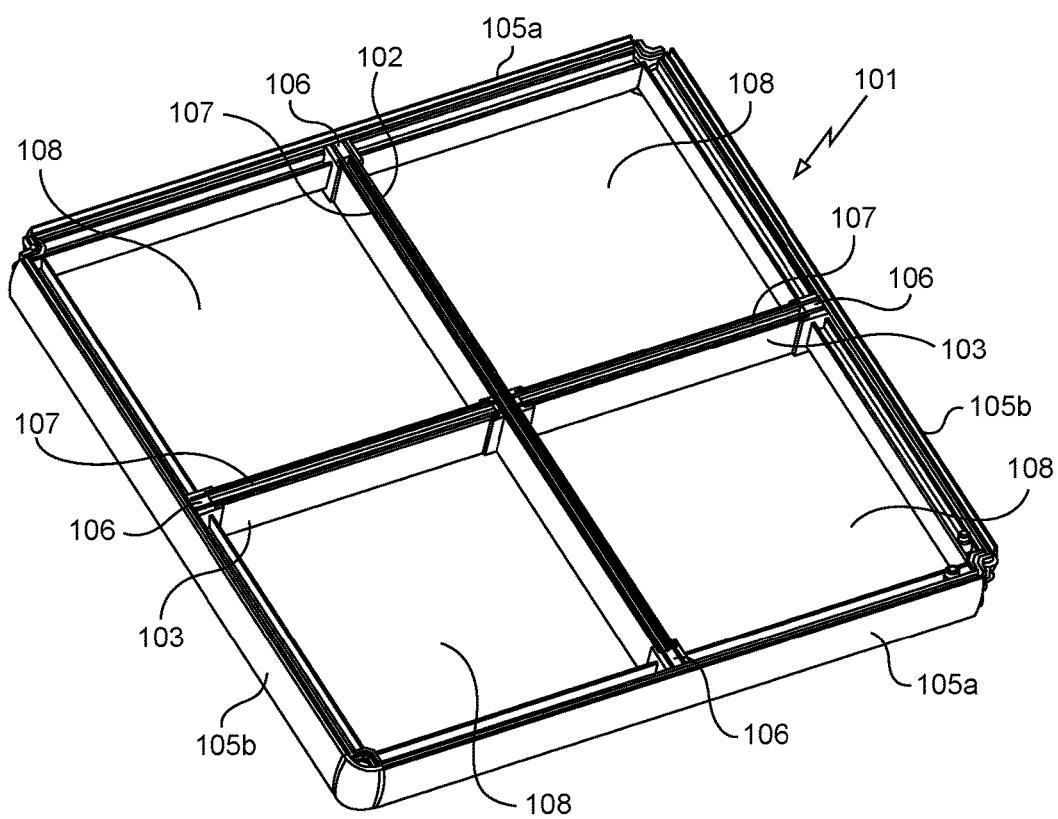
FIG. 7 is a perspective view of a modular vacuum gripper in a second embodiment of the invention, said gripper being shown without its top and bottom walls.

In a second embodiment, shown in FIG. 7, the vacuum gripper of the invention 101 has a main crosspiece 102 and two secondary crosspieces 103 positioned inside the vacuum gripper 101. The main crosspiece 102 extends between the centers of two opposite framework members 105a situated facing each other. Each of the secondary crosspieces 103 extends between the centre of one of the other framework members 105b and the centre of the main crosspiece 102. Each end of the main and secondary crosspieces that is situated at a framework member 105 is fastened to said framework member 105 via a fastening piece 106 comprising a channel-section shaped element having a recess inside which the framework member extends. Each crosspiece 102, 103 is provided with two flat seals 107 disposed along the crosspiece in top and bottom grooves in the crosspiece 102, 103.

The crosspieces 102 103 thus form partitions that, inside the vacuum gripper 101, define four sealed and independent vacuum zones 108. Each vacuum zone 108 may be associated with a distinct vacuum generator, having a distinct number of suction cups, etc. The crosspieces also act as mechanical reinforcements for mechanically strengthening the structure of the gripper.

Naturally, the invention is not limited to the particular embodiments described above, but rather, quite to the contrary, it covers any variant lying within the ambit of the invention as defined by the claims.

Figure 8:
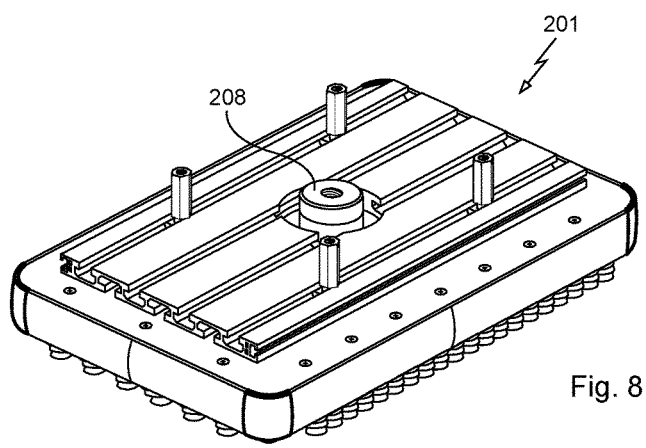
FIG. 8 is a perspective view of a modular vacuum gripper in a third embodiment of the invention.
Figure 2:
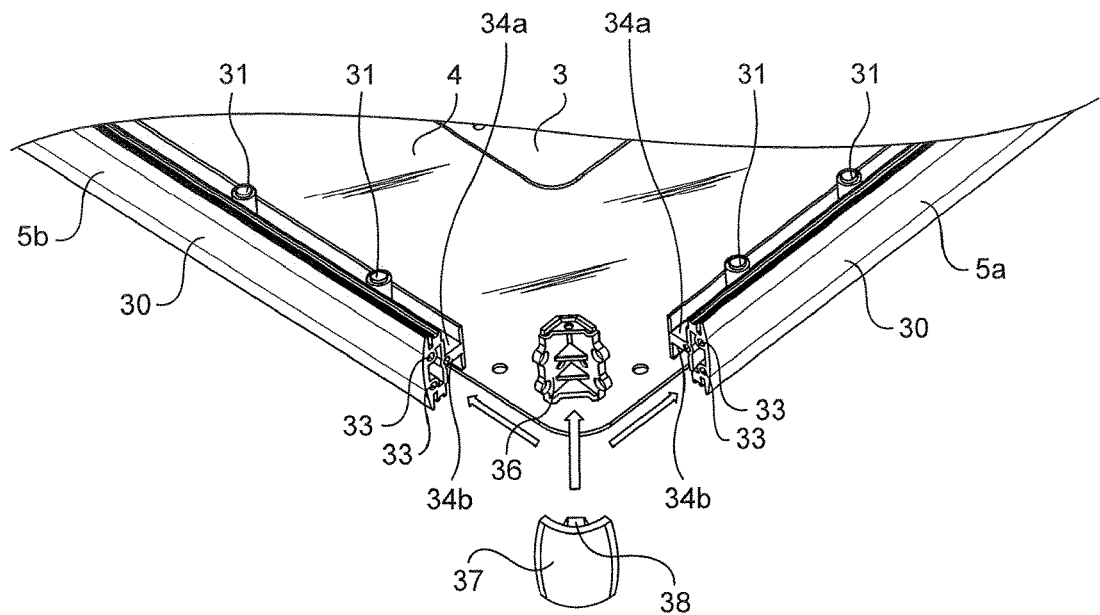
FIGS. 2 to 4 are detail views of the vacuum gripper of the invention while it is being assembled.
Figure 3:
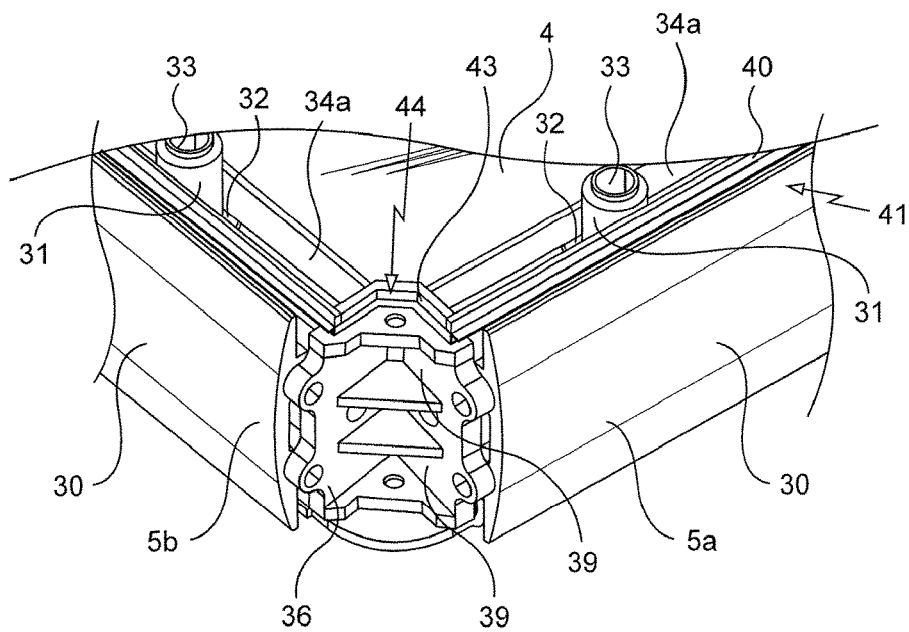
Figure 4:
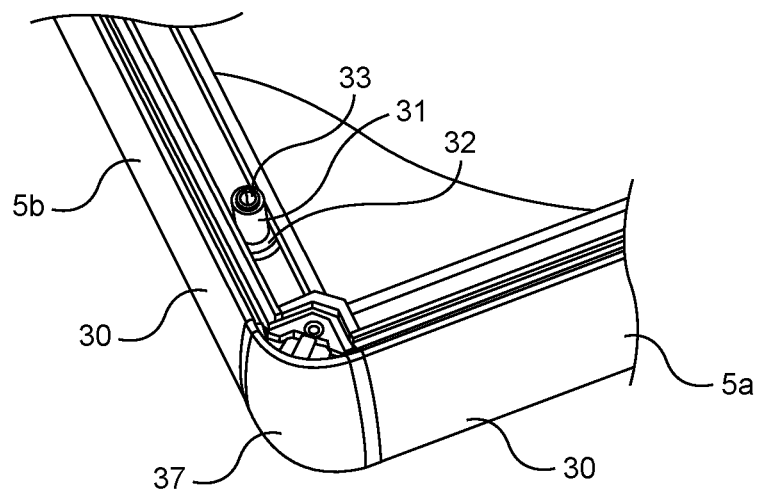
Figure 5:
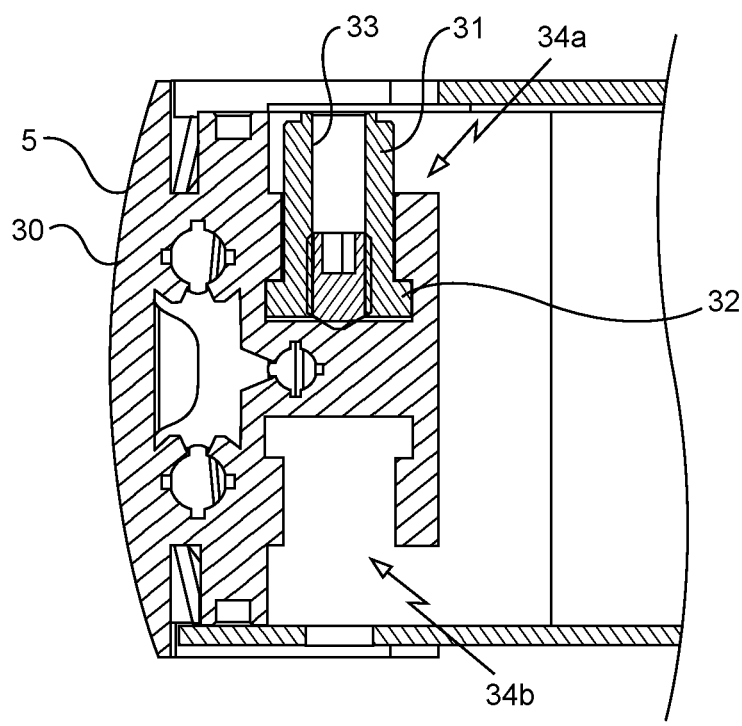
FIG. 5 is a section view of a shaped-section element of a framework member of the gripper.

Although it is indicated that the vacuum generation means are constituted by a multi-stage vacuum generator, said vacuum generation means may be different. For example, in a third embodiment, visible in FIG. 8, the vacuum gripper of the invention 201 has vacuum generation means that are formed merely by an ejector 208 having a single injection nozzle. Similarly, the vacuum generation means used may optionally include electrical control means for controlling the vacuum, blower means for disuniting the suction cups of the gripper, display means for displaying the level of vacuum, of the vacuum gauge type, etc.

Although a certain number of deformable elements are described extending over the second plate, the invention applies to any vacuum gripper having at least one deformable element. The deformable elements are not necessarily suction cups: it is naturally possible to use some other type of deformable element, e.g. a foam pad having at least one gripping point, i.e. an air passage orifice enabling a suction force to be exerted on the part.

Similarly, although it is specified that the suction cups are mounted on inserts that are themselves fastened by screw-fastening to the second plate, any other known means for providing an interface between the second plate and the suction cups or other deformable elements may be used: nozzle insets, leakage valves (when the deformable elements are constituted by a foam pad) etc.

Although it has been chosen to illustrate the invention by disposing the vacuum generation means on the first plate of the vacuum gripper, i.e. on the top wall of the vacuum gripper, they may also be positioned at a side wall, in which case the upstream orifice is situated in said side wall.

Although vacuum grippers have been described and shown in which the fastening means include a single shaped-section plate provided with an opening inside which the vacuum generator is positioned, it is possible to equip the vacuum gripper with a plurality of shaped-section plates, and in particular with two shaped-section plates positioned on either side of the vacuum generator.

Although the top and bottom walls of all of the vacuum grippers shown herein are rectangular in general shape, it is naturally possible to imagine vacuum grippers of different shapes, and in particular triangular vacuum grippers. In which case, the fastening corners are adapted so that the framework members to which they are fastened form angles less than or greater than 90° depending on the shape required for the vacuum gripper.

Although it is indicated that three crosspieces define four distinct vacuum zones inside the vacuum gripper, it is naturally possible to use a different number of crosspieces to obtain at least two distinct vacuum zones.

It is also possible to equip the modular vacuum gripper of the invention with accessories making it possible to improve gripping or to offer additional, supplementary features. For example, it is possible to equip the vacuum gripper with one or more part-presence sensors making it possible to detect whether a part to be manipulated has indeed been taken hold of by the gripper. It is also possible to equip the vacuum gripper with unstacker means including, for example, at least one vacuum generator and a suction cup for separating a part, such as a metal sheet, from other parts with which it is stacked. In addition, it is possible to equip the vacuum gripper with mechanical means for holding or maintaining the part to be manipulated, in particular with holding means that can be folded away onto the side of the vacuum gripper.

The invention claimed is:

1. A modular vacuum gripper for taking hold of a part, said modular vacuum gripper comprising:
    a first plate forming a top wall of the vacuum gripper;
    a second wall provided with at least one downstream orifice and forming a bottom wall of the vacuum gripper;
    framework members to which edges of the first and second plates are fastened and that form side walls of the vacuum gripper;
    assembling means for the first plate, the second plate and the framework members, the assembling means forming corners of the vacuum gripper;
    at least one upstream orifice situated on one of the walls of the vacuum gripper;
    sealing means for preventing exchange of air between the inside of the vacuum gripper and the outside of the vacuum gripper other than via the upstream orifice and via the downstream orifice;
    vacuum generating means to suck out the air contained inside the vacuum gripper via the upstream orifice so as to generate a vacuum inside the vacuum gripper; and
    at least one deformable element extending over the second plate and having an air passage orifice facing the downstream orifice so as to form a sealed contact surface with the part when the air contained inside the vacuum gripper is sucked out.

2. The modular vacuum gripper according to claim 1, wherein at least one framework member includes a shaped-section element.

3. The modular vacuum gripper according to claim 1, wherein the first and second plates and the assembling means are screwed to the framework members.

4. The modular vacuum gripper according to claim 1, wherein the sealing means comprise at least one flat seal extending over a length of at least one of the framework members.

5. The modular vacuum gripper according to claim 1, further including fastening means situated on the first plate and arranged to enable the vacuum gripper to be manipulated.

6. The modular vacuum gripper according to claim 5, wherein the fastening means include at least one shaped-section portion.

7. The modular vacuum gripper according to claim 1, wherein the deformable element includes at least one suction cup.

8. The modular vacuum gripper according to claim 1, wherein the vacuum generating means operate by Venturi effect.

9. The modular vacuum gripper according to claim 1, including at least one crosspiece defining, inside the vacuum gripper, at least two sealed and independent vacuum zones.

10. The modular vacuum gripper according to claim 1, including at least one anti-implosion protective stud that extends between the first plate and the second plate.

\* \* \* \* \*